United States Patent
Zhang et al.

(10) Patent No.: US 10,637,575 B2
(45) Date of Patent: Apr. 28, 2020

(54) SPATIAL LOCATION INDOORS USING STANDARD FLUORESCENT FIXTURES

(71) Applicant: Wisconsin Alumni Research Foundation, Madison, WI (US)

(72) Inventors: Xinyu Zhang, Madison, WI (US); Chi Zhang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/164,195

(22) Filed: May 25, 2016

(65) Prior Publication Data
US 2017/0346558 A1   Nov. 30, 2017

(51) Int. Cl.
H04B 10/116 (2013.01)
H04W 4/024 (2018.01)
H04W 4/02 (2018.01)
H04B 10/114 (2013.01)

(52) U.S. Cl.
CPC ............ *H04B 10/116* (2013.01); *H04W 4/02* (2013.01); *H04W 4/024* (2018.02); *H04B 10/1141* (2013.01)

(58) Field of Classification Search
None
See application file for complete search history.

(56) References Cited

U.S. PATENT DOCUMENTS

| | | | |
|---|---|---|---|
| 2,760,072 A | 8/1956 | Hugenholtz et al. | |
| 4,578,665 A | 3/1986 | Yang | |
| 4,967,751 A | 11/1990 | Sterzer | |
| 4,996,462 A * | 2/1991 | Krummel | H05B 41/28 315/208 |
| 5,036,542 A | 7/1991 | Kehoe et al. | |
| 5,546,072 A | 8/1996 | Creuseremee et al. | |
| 5,790,032 A | 8/1998 | Schmidt | |
| 5,815,112 A | 9/1998 | Sasaki et al. | |
| 5,955,951 A | 9/1999 | Wischerop et al. | |
| 5,960,089 A | 9/1999 | Bouricius et al. | |
| 6,256,303 B1 | 7/2001 | Drakoulis et al. | |
| 6,285,865 B1 | 9/2001 | Vorenkamp et al. | |
| 6,288,641 B1 | 9/2001 | Casais | |
| 6,640,084 B2 | 10/2003 | Pande et al. | |
| 6,657,401 B2 * | 12/2003 | Kominami | H05B 37/0263 315/291 |

(Continued)

FOREIGN PATENT DOCUMENTS

WO     2015077767 A1     5/2015

OTHER PUBLICATIONS

Hinman et al., Using Talking Lights Illumination-Based Communication Networks to Enhance Word Comprehension by People Who Are Deaf or Hard of Hearing, 2003, American Journal of Audiology, pp. 17-22.*

(Continued)

*Primary Examiner* — Jai M Lee
(74) *Attorney, Agent, or Firm* — Boyle Fredrickson, S.C.

(57) ABSTRACT

A system for identifying the location of the mobile device uses standard fluorescent light fixtures commonly found in indoor environments and detects minor variations in the light output of those fixtures caused by normal manufacturing variation. These variations are catalogued as identifying fingerprints together with location of the light fixtures to provide for navigation.

23 Claims, 4 Drawing Sheets

(56) References Cited

U.S. PATENT DOCUMENTS

| | | | |
|---|---|---|---|
| 6,949,074 B2 | 9/2005 | Fatemi | |
| 7,272,431 B2 | 9/2007 | McGrath | |
| 9,791,542 B2* | 10/2017 | Ryan | G01S 5/16 |
| 2003/0052970 A1 | 3/2003 | Dodds et al. | |
| 2005/0136782 A1* | 6/2005 | Chen | C09K 11/7736 |
| | | | 445/24 |
| 2005/0152127 A1* | 7/2005 | Kamiya | F21V 3/04 |
| | | | 362/84 |
| 2005/0243237 A1* | 11/2005 | Sasuga | F21V 14/003 |
| | | | 349/57 |
| 2008/0281515 A1* | 11/2008 | Ann | G01C 21/20 |
| | | | 701/434 |
| 2009/0157309 A1* | 6/2009 | Won | G01C 21/20 |
| | | | 701/533 |
| 2012/0163826 A1* | 6/2012 | Schenk | H05B 37/0272 |
| | | | 398/91 |
| 2013/0221858 A1* | 8/2013 | Silberstein | H05B 37/0272 |
| | | | 315/153 |
| 2013/0330085 A1* | 12/2013 | Kusakari | H04B 10/25758 |
| | | | 398/115 |
| 2013/0331037 A1* | 12/2013 | Kusakari | H04B 1/03 |
| | | | 455/66.1 |
| 2014/0141803 A1* | 5/2014 | Marti | H04W 4/043 |
| | | | 455/456.2 |
| 2014/0186049 A1* | 7/2014 | Oshima | H04B 10/1143 |
| | | | 398/118 |
| 2014/0235269 A1 | 8/2014 | Ericsson et al. | |
| 2014/0314420 A1* | 10/2014 | De Bruijn | H05B 37/0272 |
| | | | 398/127 |
| 2015/0028763 A1* | 1/2015 | Feri | H05B 37/0272 |
| | | | 315/210 |
| 2015/0147067 A1* | 5/2015 | Ryan | H04B 10/116 |
| | | | 398/118 |
| 2015/0153160 A1* | 6/2015 | James | G01C 21/206 |
| | | | 356/51 |
| 2015/0349883 A1* | 12/2015 | Mitchell | H04B 10/116 |
| | | | 398/118 |
| 2016/0047890 A1* | 2/2016 | Ryan | G01S 5/16 |
| | | | 398/118 |
| 2016/0054440 A1 | 2/2016 | Younis | |
| 2016/0119590 A1* | 4/2016 | Ganick | G01S 1/70 |
| | | | 348/61 |
| 2016/0139232 A1* | 5/2016 | Ganick | G01S 1/70 |
| | | | 398/127 |
| 2016/0164603 A1* | 6/2016 | De Bruijn | H04B 10/116 |
| | | | 398/118 |
| 2016/0323035 A1* | 11/2016 | Jovicic | H04B 10/0795 |
| 2018/0176739 A1* | 6/2018 | Zhang | H04W 4/029 |
| 2018/0376570 A1* | 12/2018 | Verbrugh | H05B 37/0245 |

OTHER PUBLICATIONS

Kuo et al., Luxapose: Indoor Positioning with Mobile Phones and Visible Light, Sep. 2014.*

Wikepida, Bokeh, https://web.archive.org/web/20140101112849/http://en.wikipedia.org/wiki/Bokeh, Jan. 2014.*

Chakrabarti, Amlan, Energy Engineering and Management, 2011, PHI Learning Private Limited, pp. 32-36.*

Verderber et al., Harmonics from Compact Flurorescent Lamps, 1993, IEEE, pp. 670-674.*

Hovey, Jimmy, T8 Lighting: What is the Actual Lumen Output for T8 Fluorescent Bulbs?, 2013, pp. 1-4.*

Wikipedia, Nightlight, Apr. 2015.*

Kateri et al., Variation of the instantaneous luminous flux of fluorescent lamps fed by dimmable electronic ballasts with frequency control, 2007, IET Electr. Power Appl., pp. 890-896 (Year: 2007).*

Franco et al., Compact fluorescent lamps, LED lamps and harmonic distortion, 2013, IOP Pubishing, pp. 1-4 (Year: 2013).*

NLPIP, Electronic Ballasts, 2000, pp. 6-8 and 18 (Year: 2000).*

Lamptech, Fluorescent Lamp Colours, Mar. 2013 (Year: 2013).*

Santander et al., A Comprehensive Harmonic Study of Electronic Ballasts and Their Effect on a Utility's 12 KV, 10 MVA Feeder, 1994, IEEE, pp. 1591-1599 (Year: 1994).*

Kuo, Ye-Sheng, Luxapose: Indoor Positioning with Mobile Phones and Visible Light, 2014 (Year: 2014).*

Hinman et al., Using Talking Lights Illumination-Based Communication Networks to Enhance Word Comprehension by People who are Deaf or Hard of Hearing, 2003, American Speech-Language-Hearing Association (Year: 2003).*

LiTell: Robust Indoor Localization Using Unmodified Light Fixtures; Paper ID: 183; pp. 1-14; US.

International Search Report; Application No. PCT/US2017/030960; dated Jul. 21, 2017.

* cited by examiner

SPATIAL LOCATION INDOORS USING STANDARD FLUORESCENT FIXTURES

STATEMENT REGARDING FEDERALLY SPONSORED RESEARCH OR DEVELOPMENT

This invention was made with government support under CNS1350039 and CNS1343363 awarded by the National Science Foundation. The government has certain rights in the invention.

CROSS REFERENCE TO RELATED APPLICATION

Background of the Invention

The present invention relates to systems for accurately locating mobile devices, and in particular to a system providing location-sensing using the locations of standard indoor fluorescent light fixtures.

Increased use of light emitting diodes (LEDs) to provide for the primary environmental lighting in buildings and the like (termed herein "ambient lighting") has raised the possibility of using these lights as beacons to identify the location of a mobile device viewing these lights. Under such a system, each LED light may transmit a unique code in the light output identifying the light, and its location. LEDs are particularly suited to this application because they can switch on and off at a high rate of speed imperceptible to human eyes but suitable for communicating data. The IEEE 802.1 5.7 standard has established a basis for visible light communication protocols allowing communication of up to 96 megabits per second.

U.S. patent application Ser. No. 14/980,103 filed Dec. 28, 2015, assigned to the assignee of the present application and hereby incorporated by reference, describes a system using light communication signals of this type to identify the location of a mobile device.

Using data communicated through LED ambient lighting for the purpose of navigation systems currently requires substantial investment in building infrastructure both to upgrade current light fixtures to network-connectable LED light fixtures and to properly configure a network for providing navigation signals.

SUMMARY OF THE INVENTION

The present invention provides a navigation system that can work with standard fluorescent light fixtures, without networking capabilities, such as represent a substantial percentage of current installed indoor lighting. In this regard, the inventors have discovered that the wide adoption of electronic ballasts in fluorescent lights has resulted in the introduction of a measurable high frequency noise signal in the light output that varies identifiably according to manufacturing tolerances of the ballasts. Using this noise signal, each light fixture can be uniquely "fingerprinted" and the fingerprint associated with a predetermined location for the purpose of navigation. Importantly, this noise signal in the light output by the fluorescent light fixture is not irretrievably obscured by fluorescent phosphor decay time, EMI filtering and the like.

Specifically, in one embodiment, the invention provides a method of indoor position location in which light from multiple fluorescent fixtures is first analyzed to isolate fixture-identifying characteristics of light from each fixture caused by manufacturing variations in the fluorescent fixtures. These fixture-identifying characteristics are linked in a data structure to the locations of the multiple fluorescent fixtures. Navigation is then provided by measuring light from a given fluorescent fixture in the location using a mobile light sensor and matching characteristics of the measured light against fixture-identifying characteristics in the data structure to identify a location of the given fluorescent fixture. This location of the given fluorescent fixture is used to identify a location of the mobile light sensor.

It is thus a feature of at least one embodiment of the invention to permit indoor navigation using unmodified light fixtures and without access to a building network infrastructure.

The fluorescent light fixtures comprise a standard electronic ballast receiving line AC voltage to drive a fluorescent light bulb.

It is thus a feature of at least one embodiment of the invention to make use of the inverter structure of an electronic ballast to provide a signal unlinked from synchronization with line voltage frequency such as can differentiate between light fixtures.

The fixture-identifying characteristic may be the frequency of a frequency component of the light in excess of 40 kilohertz.

It is thus a feature of at least one embodiment of the invention to identify a high-frequency signal that would provide a set of distinguishable different frequency values driven by normal manufacturing tolerances.

The frequency-identifying characteristic may be the frequency of a frequency component of the light in excess of 60 kilohertz.

It is thus a feature of at least one embodiment of the invention to exploit a harmonic above the range of normal electronic ballast inverter frequencies (20-60 kilohertz) having a boosted amplitude because of features of the inverter construction providing practical signal-to-noise ratio.

The method may select among multiple fixture-identifying characteristics in the data structure matching the measured light based on a previous identified location of the mobile light sensor.

It is thus a feature of at least one embodiment of the invention to accommodate possible light fixtures with indistinguishable fixture-identifying characteristics such as could occur when those characteristics are the result of random manufacturing variation.

The mobile light sensor may be an electronic camera imaging the given fluorescent light fixture, and locating the mobile light sensor may use an angle of the given light fixture in the image and the location of the give fluorescent fixture to identify the location of the mobile light sensor.

Alternatively or in addition, locating the mobile light sensor may use at least one of a size and shape of the given light fixture in the image and the location of the given fluorescent fixture to identify the location of the mobile light sensor.

It is thus a feature of at least one embodiment of the invention to provide navigational accuracy at less than the spacing of the light fixtures through geometric analysis of the light fixture image.

The light sensor may be a multipixel electronic camera and the program may measure the light from a given fluorescent fixture by treating different rows of pixels as different time domain samples.

It is thus a feature of at least one embodiment of the invention to enlist a relatively slow camera sensor for the measurement of high-frequency, fixture-identifying signals in the light fixtures. By using each row as a separate sample, an effective sample speed can be increased by several orders of magnitude.

The multipixel electronic camera may have a focusable lens and the program may move the lens to a close focus to blur an image of the fluorescent light fixture.

It is thus a feature of at least one embodiment of the invention to use the camera lens to suppress spatial modulation (for example, a diffuser grid) on the light fixture to prevent spatial modulation from being interpreted as temporal modulation when using row-based sampling of the image.

These particular objects and advantages may apply to only some embodiments falling within the claims and thus do not define the scope of the invention.

DETAILED DESCRIPTION OF THE PREFERRED EMBODIMENT

Figure 1:
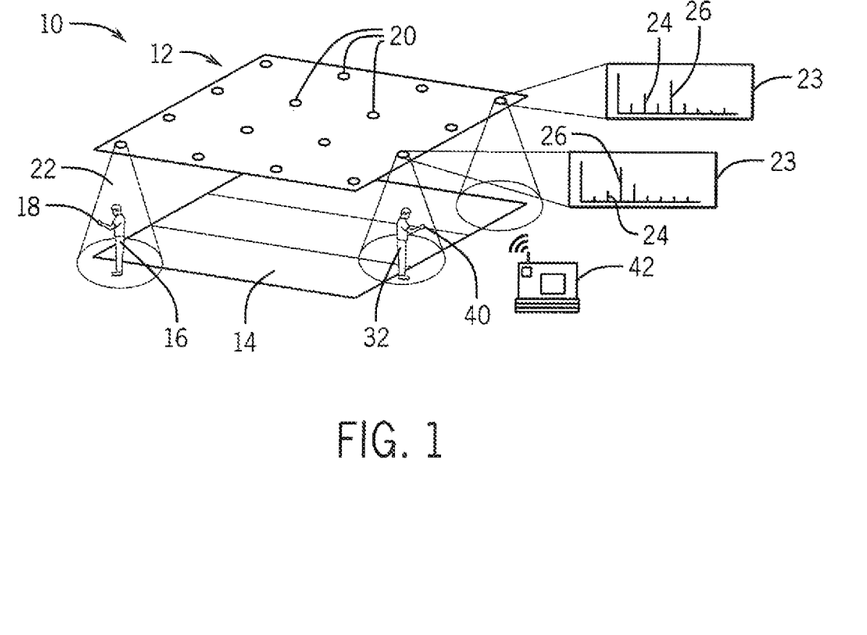
FIG. 1 is a perspective view of a mobile device for navigation, and a cataloging device for generating navigational tables within an area having multiple fluorescent light fixtures providing ambient lighting.

Referring now to FIG. 1, the present invention may provide for a locator system 10 operating within a volume 12, for example, the interior of a structure such as a store, office building, hospital, airline terminal or the like, having a floor area 14 over which individuals 16 may move together with a location-identifying device 18.

Volume 12 may be illuminated, for example, by ceiling mounted fluorescent light fixtures 20, each projecting a downward cone 22 of visible light to illuminate the floor area 14 as is generally understood in the art. The volumes of the cones 22 will typically overlap for the purpose of providing uniform lighting; however, overlap is not critical to the present invention. The term "cone" is used generally in this application, it being understood that the shape of the illuminated region for a given light fixture is highly variable and that the boundaries of projected light are generally gradated and indistinct.

Each of the fluorescent light fixtures 20 may be of conventional design providing one or more fluorescent lamps controlled by an electronic ballast receiving line voltage of about 110 volts AC at 60 cycles. Fluorescent lamps, as are understood in the art, provide a low-pressure glass envelope typically supporting a mercury vapor gas discharge which produces shortwave ultraviolet light. This ultraviolet light strikes a phosphor coating on the inside of the lamp envelope causing the phosphor to glow.

The fluorescent lamp does not connect directly to line voltage but must be driven by a ballast. The ballast serves to prevent the low impedance of the electronic arc in the fluorescent lamp from drawing too much power. Modern lighting fixtures principally use electronic ballasts that further operate by converting line voltage to DC power and then "inverting" that DC power to a high-frequency signal generally in the range of 20,000 to 60,000 hertz. The inverter uses solid-state components such as transistors to perform the inversion and the ballast function of current limiting. Because of the potential of electromagnetic interference at the output frequency of the inverter, the output of electronic ballast is usually filtered using noise suppression filtration to block radio interference (electromagnetic interference) from this high-frequency signal.

Electronic ballasts may be contrasted to older magnetic ballasts which employ no solid-state devices and operate generally as a step up transformer and current limiting inductor. The efficiency gains possible with electronic ballasts and the reduction in flicker provided by high-frequency inverter operation has caused electronic ballasts to substantially replace magnetic ballasts for commercial lighting.

The inventors have determined that high-frequency signals from the ballast as it drives the load of the fluorescent lamp can be detected in the light output from the light fixture 20. This is despite phosphor persistence and electromagnetic interference filtering that might be expected to eliminate such signals. The high-frequency signals from each light fixture 20 in the form of identifying frequency spectra 23 can vary significantly between light fixtures 20 as a result of manufacturing variation by such a degree that these variations provide a fingerprint of the light fixture 20 that can be used to distinguish between each light fixture 20.

Generally each spectra 23 will provide a fundamental frequency 24 at a switching frequency of the inverter (20 to 60,000 hertz) as well as various harmonics of this fundamental frequency 24. The inventors have determined that the first harmonic 26 of this fundamental frequency 24 will generally have a higher magnitude than the fundamental frequency 24 and thus provides sufficient signal strength for practical use. While the inventors do not wish to be bound by a particular theory, this higher magnitude of the first harmonic appears to be the result of different gains between the positive and negative halves of the signals produced by the inverter. Notably, this boosting of the first harmonic 26 makes the first harmonic 26 visible in the light output of the light fixture 20 when other spectral features are impossible to detect with standard hardware in a normal office environment.

Importantly, the first harmonic 26 may vary by a range among different light fixtures 20 of a few kilohertz because of manufacturing variations in one or both of the ballast and fluorescent tube such as may be readily distinguished. The inventors have also determined that the frequency of the first harmonic 26 is relatively stable over time and within the temperature range of a normal interior environment. Generally, in a principal embodiment, the invention uses the frequency of the first harmonic 26 as a fingerprint uniquely identifying each light fixture 20 and uses the identification of the light fixture 20 to determine a location of the light fixture 20 for use in navigation and location determination.

General Location Identification

Figure 2:
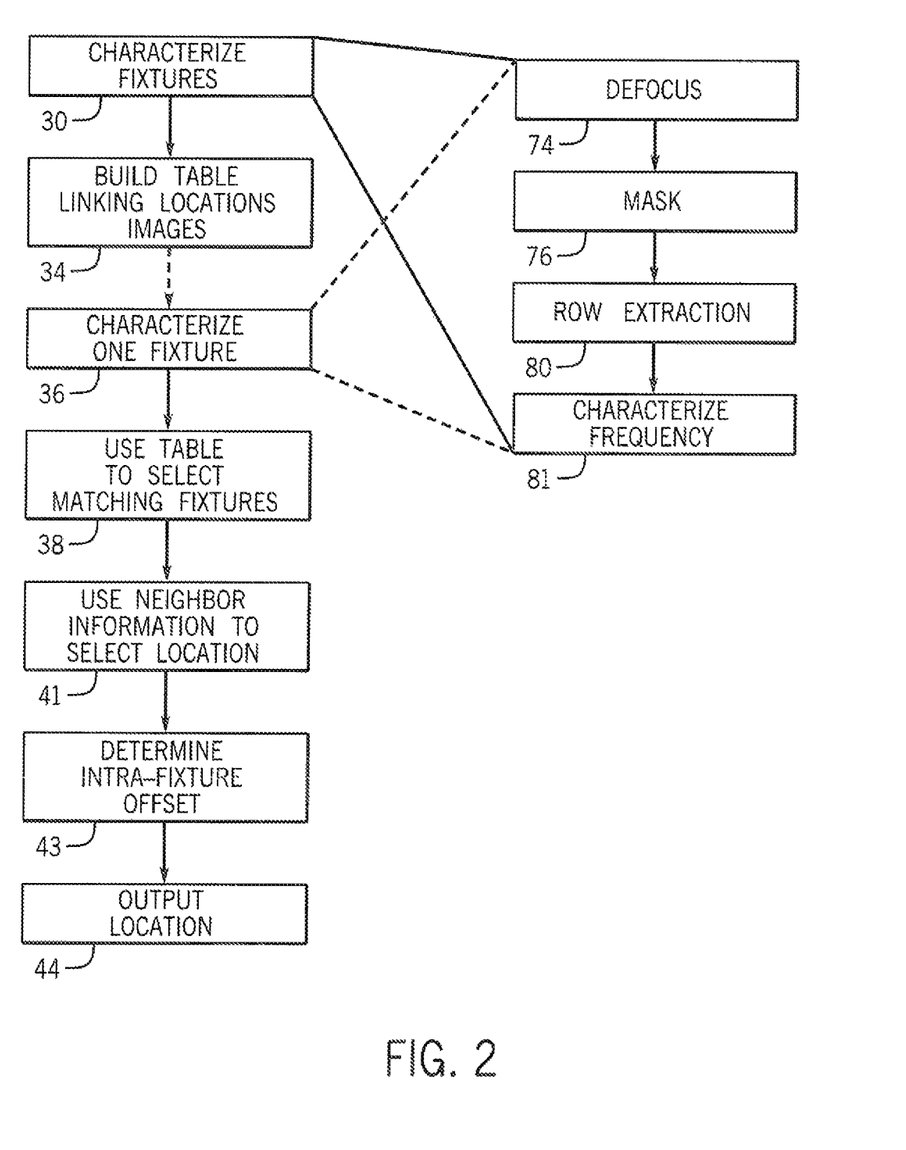
FIG. 2 is a flowchart of a program executed by the cataloging device and the mobile device for navigation (possibly in communication with other computing systems) in generating and using navigational tables.

Referring now to FIGS. 1 and 2, at a first step in this process, as indicated by process block 30, the light fixtures 20 are characterized, for example, by a mapping individual 32 measuring the light output from each light fixture 20 and a location of the light fixture 20. One or both of these tasks may be performed using, for example, a handheld cataloging device 40 such as a smart phone as will be discussed below. The measurement of the light output from each fixture 20 is used to develop a fingerprint as will be discussed below.

The fingerprint for each light fixture 20 is used to build a navigation table per process block 34 providing data structure with a logical row holding a fingerprint of each light fixture 20 in a first column linked to spatial coordinates of the light fixture 20 in a second column. Notably this process does not require access to any building infrastructure and thus is relatively easy to perform.

Once this data navigation table is complete it may be uploaded to the portable location-identifying device 18 of individual 16. The portable location-identifying device 18, like the handheld cataloging device 40, may be a smart phone as will be discussed below. The portable location-identifying device 18 may be used to characterize the closest light fixture 20 as indicated by process block 36 to extract a fingerprint from that closest light fixture 20. At process block 38 the navigation table in the portable location-identifying device 18 is used to match the fingerprint obtained from the closest light fixture 20 to one or more fingerprints in the navigation table. This matching, for example, may use a simple linear search algorithm to evaluate the minimum difference between the two fingerprints within a predetermined threshold. A recent history of the number of matches obtained may be used to dynamically adjust this predetermined threshold to limit the number of matches to a predetermined value.

At process block 41, in the event that the matching process yields more than one matching fingerprint, a previous location of the individual 16 is used to select among these choices under the assumption that the individual 16 will move slowly compared to the processing steps to determine the location of the individual 16 and thus will be near a previously determined location.

If the matching produces no candidates, it may be that closest light fixture 20 was replaced after the cataloging of the steps of process blocks 30 and 34. This information, for example, may be relayed to a server 42 and used to heuristically update navigation table 56 over a period of time as the new light fixture fingerprint is confirmed by multiple location-identifying devices 18 to maintain the accuracy of the navigation table.

At process block 43, additional techniques may be used to determine an offset between the location of the closest light fixture 20 and the actual location of the portable location-identifying device 18 as will be discussed in more detail below. This offset information provides location information at a finer granularity than the spacing of the light fixtures 20.

At process block 44 to deduce the position of the individual 16, the position of the location-identifying device 18 may be output, for example, to the individual 16 to help the individual 16 navigate through the volume 12 or to a remote information server providing information to the individual 16 based on his or her location in the volume 12. For example, this information may be about promotions in a store or about nearby art objects in a museum or the like. This information may also be output remotely to individuals who need to find individual 16, for example, in a paging situation.

The processing required of the above steps may be accomplished in the cataloging device 40 or the location-identifying device 18 alone, or these devices may communicate, for example, wirelessly to a central server 42 having a processor and memory for executing the necessary program to perform the steps. Likewise the navigation table may be stored remotely.

Hardware Platform

Figure 3:
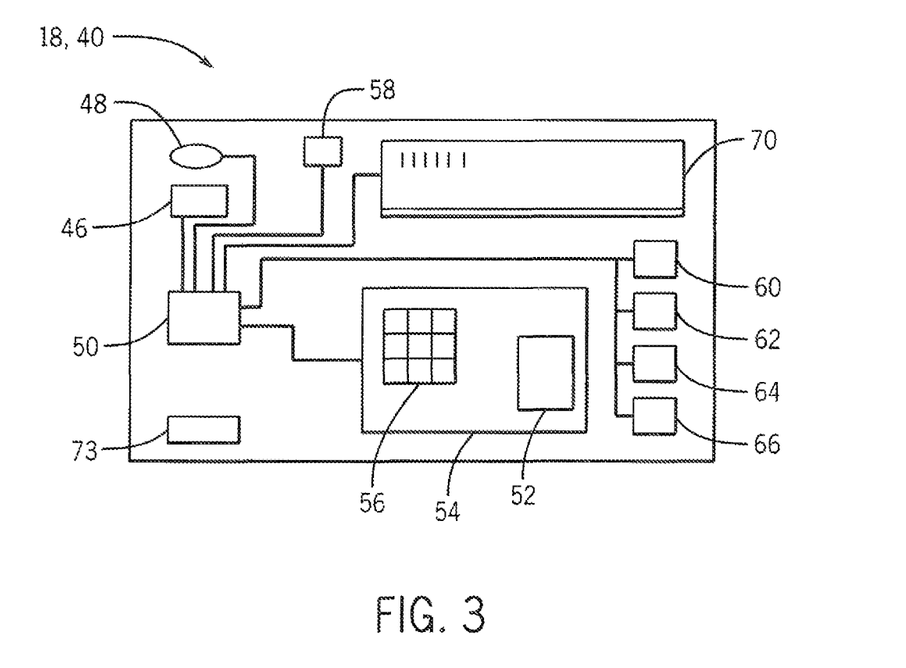
FIG. 3 is a simplified block diagram of the cataloging device and the mobile device for navigation providing a camera with multiple orientation sensors.

In one embodiment the invention may work with currently existing smart phones and similar devices in the capacity of the location-identifying device 18 and cataloging device 40, eliminating the need for specialized hardware. Such devices may include a multi-pixel CMOS camera 46 optionally having a focusable lens 48, for example, to allow a switching between a macro and a distant mode. The camera and a lens actuator mechanism may communicate with a processor 50 to provide data to the processor 50 and to be controlled by the processor 50.

In this regard, the processor 50 may execute a stored program 52 contained in a computer memory 54 executing the steps described in the present application. The memory 54 may also include the navigation table 56 described above and established in process block 34 and used in process block 38.

The device, in some cases, may also provide for a single light sensor 58 which may permit high bandwidth detection of variations in light signals from the light fixtures 20 that may be used in lieu of the camera 46 for portions of steps of process blocks 30 and 36.

The processor 50 may also communicate with one or more peripheral devices including a GPS subsystem 60, a wireless transceiver 62 (Wi-Fi and/or cell phone transceiver), a three-axis accelerometer 64, a gyroscope, and a compass 66. These devices may be used by the mapping individual 32 for identifying his or her location during the generation of navigation table 56, for example, by using an augmented OPS system, wireless triangulation and dead reckoning or the like. Other mechanisms of determining the location of the mapping individual 32 may be used including standard surveying techniques or position location on a map, it being understood that this location determination need only be performed at one time.

These peripheral devices of the three-axis accelerometer 64, gyroscope, and compass 66 may also be used for offset determination per process block 43 as will be described. The wireless transceiver 62 may be used to communicate with the server 42 for shared computation and data storage.

Typically, the processor 50 will also communicate with an interface screen 70, for example, a touchscreen of a type well known in the art to receive commands from and provide information to the user of the device. Normally the device will operate on battery power using contained batteries 73 and may have a handheld form factor so that it may be used in an elevated location within three meters of the light fixtures 20.

Extracting Fingerprint Information with a Camera

Figure 4:
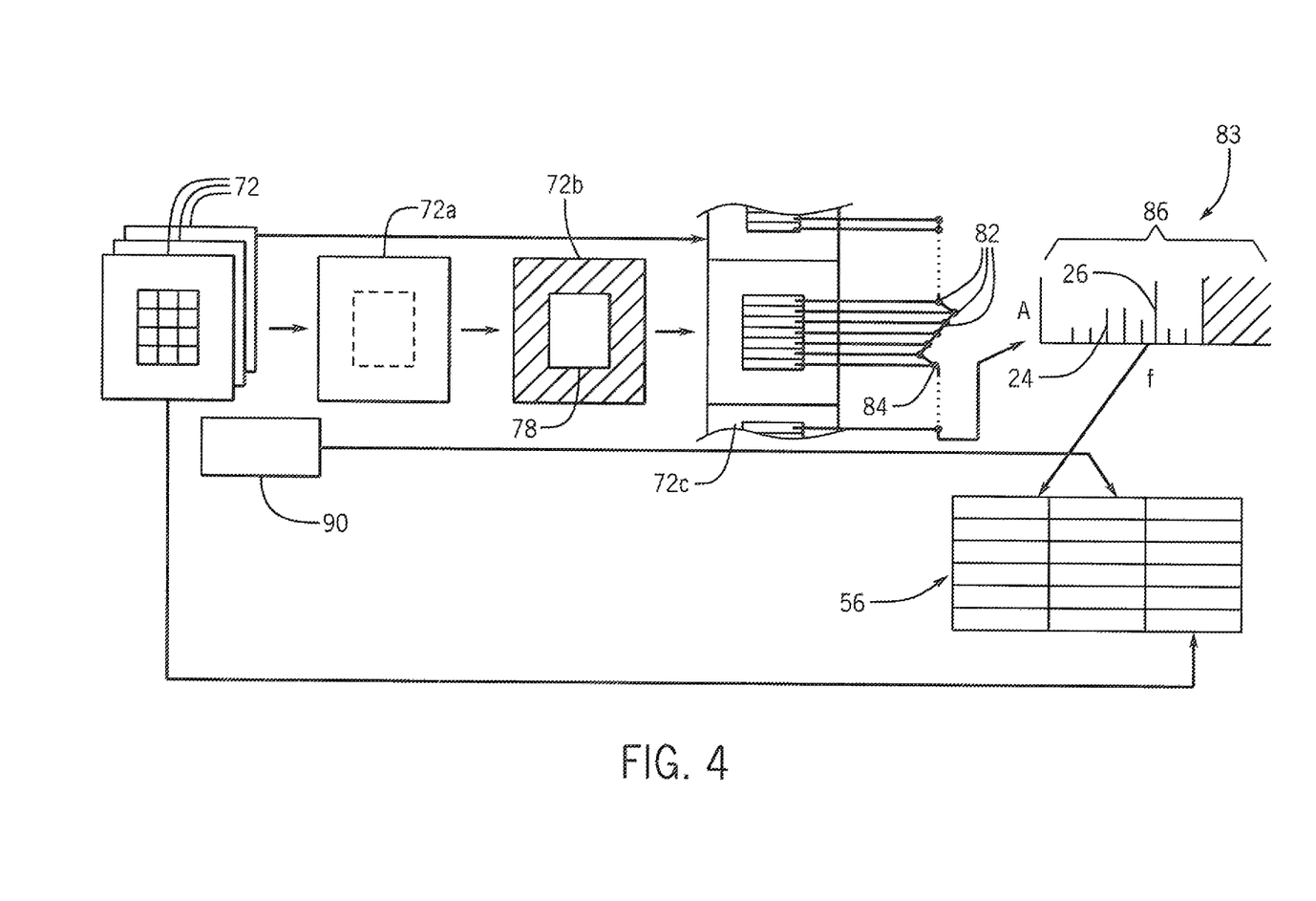
FIG. 4 is a data flow diagram of the processing of images obtained from the cataloging device and the mobile device for navigation in identifying fixture-identifying features of the multiple fluorescent light fixture.

Referring now also to FIG. 2 and FIG. 4, in one embodiment, the characterization of the light fixtures 20 at process blocks 30 and 36 may begin by the acquisition of multiple upwardly directed images 72 using the camera 46 of the relevant device. Each of the multiple images 72 may be separately processed according to the steps that will now be discussed and the output of that processing combined later in the process, as will also be described, to provide a more robust signal for analysis and improved signal-to-noise ratio in the resulting fingerprint data. During this acquisition of the multiple images 72, the ISO value of the camera is set to its highest setting.

As indicated by image 72a, each of the images 72 will be acquired in, unfocused configuration, for example, with the lens 48 positioned for close-up focus to intentionally blur an image of the more distant light fixtures 20. This defocused acquisition is shown by process block 74. A blurring caused by the defocused acquisition serves to remove spatial frequency content in the image that might be interpreted as temporal frequency content in the processing that will follow. Critically this blurring must be done at the point of projecting the image on the camera 46 rather than, for example, by mathematical operation on adjacent pixels recorded by the camera 46 such as could remove temporal data used by the subsequent processing steps.

At this step of process block 74, the measurements from the interleaved color sensors in the camera 46 (providing color imaging) are processed by normalizing each row according to its apparent gain and combining those rows. This eliminates a spurious variation between the rows caused by gain differences that could be interpreted as temporal frequency data.

As indicated by process block 76 and image 72b, at a next step, the image of the light fixture is isolated with a mask 78 developed using standard morphological processing of a threshold filtration followed by a morphological opening and closing operation. Data outside this mask is effectively discarded with respect to the next steps.

As indicated by image 72c and process block 80, the data from each region of the masks 78 is then concatenated vertically to provide an extended image providing multiple rows of light fixture images as masked in excess of the number of rows in a single image. This concatenation greatly improves the frequency analysis that will now be performed.

CMOS cameras 46 normally use a "rolling shutter" exposure in which each row of the image sensor is successively exposed one at a time. For this reason, the data of each row represents a separate sample of the light from the light fixture 20 at a different successive sample time allowing effective sampling of the light output from the light fixtures 20 at a rate far higher than the frame rate at which successive images 72 can be obtained. In practice, the sampling rate will be the camera frame rate times the number of rows. For a high definition camera this can be as high as 30 frames per second times 1080 rows or about 34,000 samples per second.

The data from each row of the concatenated masked images may be averaged (after weighting according to the number of pixels of the light fixture 20 represented by that row) to provide an individual sample 82 in a time domain waveform 84 representing modulation of the light from the light fixture 20. This time domain waveform 84 may then be processed by the Fourier transform to provide a spectrum 83.

Even with this row-based sampling, the sampling rate will be far below the Nyquist sampling rate for the target fingerprint signal (first harmonic 26 at 40-120 kilohertz). As a result the measurement of the frequency of the first harmonic 26 will be aliased with other signals at different frequencies into a limited frequency range 86 in the spectrum of the time domain waveform 84. Nevertheless, because of the high amplitude of the first harmonic 26 and the fact that the number of spectral components is relatively sparse, this aliasing does not prevent isolation of the first harmonic 26 per process block 81.

The frequency of the first harmonic 26 thus obtained may be either used at process block 38 or at process block 34 and added to the navigation table 56 together with location data obtained at the time of first acquisition of the images 72 as indicated by block 90. This location data, as noted above may be obtained in a variety of different ways. The navigation table 56 may further store a representative image 72 of the light fixture 20 that may be used to provide an offset value between the location-identifying device 18 and the closest light fixture 20. Ideally this representative image 72 will be with the camera pointed straight up and directly beneath the light fixture 20 at a known predetermined orientation and height.

Referring again to FIG. 2 and process block 43, after navigation table 56 is used in process block 38 to identify the location of location-identifying device 18 with respect to the closest light fixture 20, an offset between the location-identifying device 18 and that light fixture 20 may be computed. This offset may use one or more techniques based on the images 72 stored in the data navigation table at the row associated with the identified light fixture 20.

Figure 5:
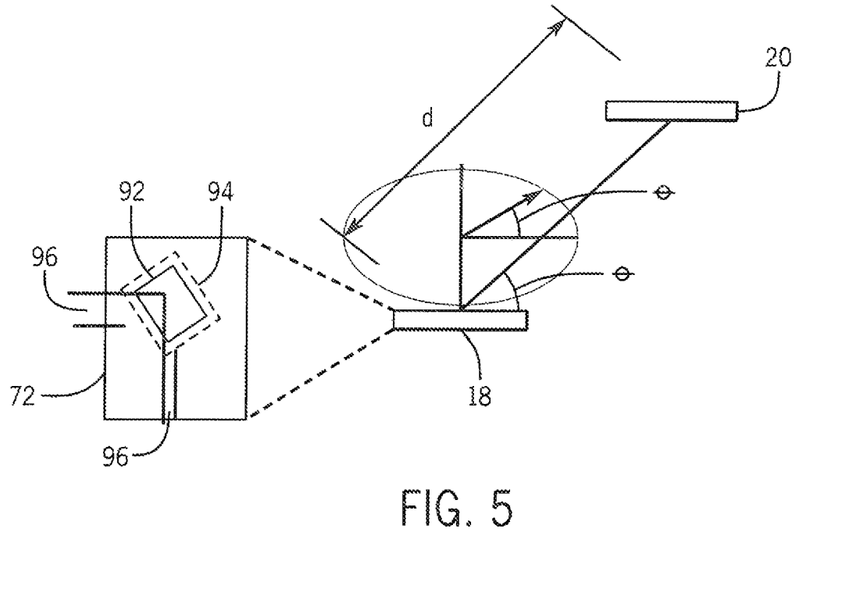
FIG. 5 is a geometric diagram showing a mobile device for navigation with respect to a fluorescent light fixture in the image produced thereby for finer grained navigation.

A current image 72' of the closest light fixture 20 is then captured and an image 92 of that closest light fixture 20 extracted using standard image processing techniques. This outline may be compared to an outline of the light fixture held in the navigation table 56 and acquired during process block 30 by mapping individual 32 to determine an offset between the location-identifying device 18 currently used for navigation and the cataloging device 40 capturing the image in the navigation table 56. This comparison may reveal a number of important features that may be used to deduce an offset from the closest light fixture 20.

First, the offset 96 of the image 92 in the currently acquired image 72' and the image 94 in the navigation table 56, together with knowledge of the orientation of the location-identifying device 18 with respect to vertical (for example, obtained from its three-axis accelerometer), can provide an elevational angle $\theta$ between the location-identifying device 18 and the light fixture 20. Likewise knowledge of the compass orientation of the location-identifying device 18 and the angle of the offset of the center of the image 92 in the currently acquired image 72' compared to the image 94 in the navigation table 56 may be used to provide an azimuthal angle $\varphi$ between the light fixture 20 and the location-identifying device 18. This angle $\varphi$ maybe confirmed or alternatively computed by comparing the offset in angle of the image 92 about its center (for example, when it is a rectangle) with the corresponding offset in angle in the image 94. Finally the size of the image 92 compared to the stored image 94 may reveal a distance d between the location-identifying device 18 and the light fixture 20. These values of d, $\theta$, and $\varphi$ allow determination of an offset of the location-identifying device 18 with respect to the closest light fixture 20 using well understood geometric calculations.

It will be appreciated that the present invention is not limited to identification of a single characteristic frequency or to identification of the first harmonic 26 but, for example, with high-speed light sensor 58 (shown in FIG. 3), may identify multiple other frequencies. Other features of the light fixtures 20 including, for example, variations in light, color, shape, or brightness may also be used to augment the identification process of the present invention to provide a multidimensional matching with improved reliability.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an," "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A method of determining indoor position location comprising:
    (a) measuring light from multiple fluorescent lamps of fluorescent fixtures subject to manufacturing tolerances arranged in a location to isolate fixture-identifying characteristics of light intensity modulation from each lamp caused by manufacturing variations resulting from the manufacturing tolerances in the fluorescent fixtures, the isolated fixture-identifying characteristics of light intensity modulation Line 8, having a spectrum with a frequency component of less than 120 kilohertz;
    (b) linking, in a data structure, the fixture-identifying characteristics to different corresponding locations of the multiple fluorescent fixtures;
    (c) measuring light from at least one lamp of a given fluorescent fixture in the location using a mobile light sensor and matching characteristics of the measured light against fixture-identifying characteristics in the data structure to identify a location of the given fluorescent fixture; and
    (d) using the location of the given fluorescent fixture to identify a location of the mobile light sensor.

2. The method of claim 1 wherein the fluorescent light fixtures comprise a standard electronic ballast receiving line AC voltage to drive a fluorescent light bulb.

3. The method of claim 1 wherein the fixture-identifying characteristic is a frequency component of intensity modulation of the light in excess of forty kilohertz.

4. The method of claim 3 wherein the fixture-identifying characteristic is a frequency component of intensity modulation of the light in excess of sixty kilohertz.

5. The method of claim 1 wherein step (c) selects among multiple fixture-identifying characteristics in the data structure matching the measured light based on a previous identified location of the mobile light sensor.

6. The method of claim 1 wherein the mobile light sensor is an electronic camera imaging the given fluorescent light fixture and wherein step (d) further uses an angle of the given light fixture in an image of the given fluorescent light fixture and the location of the given fluorescent fixture to identify the location of the mobile light sensor.

7. The method of claim 1 wherein the mobile light sensor is an electronic camera imaging the given fluorescent light fixture and wherein step (d) further uses at least one of a size and shape of the given light fixture in an image of the given fluorescent light fixture and the location of the given fluorescent fixture to identify the location of the mobile light sensor.

8. The method of claim 1 wherein the light sensor is a multipixel electronic camera and wherein the measuring of light from a fluorescent lamp of the given fluorescent light fixture measures the light by treating different rows of pixels as different time domain samples.

9. The method of claim 8 wherein the multipixel electronic camera has a focusable lens and wherein the measuring of light from the given fluorescent light fixture moves the lens to a close focus to blur an image of the fluorescent light fixture.

10. The method of claim 1 wherein the fixture-identifying characteristics of light intensity modulation are isolated from variations in circuitry of the fluorescent fixtures required for at least one of: (i) producing illumination; (2) controlling emitted radio frequency signals; and (iii) preventing excess power consumption upon lamp starting.

11. A system for indoor location determination comprising: a plurality of fluorescent fixtures having fixture-identifying characteristics of light intensity modulation of fluorescent lights of the fluorescent fixtures caused by manufacturing variations resulting from manufacturing tolerances in the fluorescent fixtures and produced by circuitry in the fluorescent fixtures required for at least one of: (i) producing illumination; (2) controlling emitted radio frequency signals; and (iii) preventing excess power consumption upon lamp starting, the circuitry producing the fixture-identifying characteristics of light intensity modulation having spectrum with a frequency component of less than 120 kilohertz;
    a mobile device having:
    (a) a light sensor sensitive to light from fluorescent lights; and
    (b) an electronic computer having:
    a processor and
    a memory communicating with the processor and holding:

(i) a data structure linking the fixture-identifying characteristics of light intensity modulation in fluorescent lights of multiple fluorescent fixtures in a location to corresponding locations of each of the multiple fluorescent fixtures; and (ii) a program used by the processor to measure light from a fluorescent lamp of a given fluorescent fixture using the light sensor and operating to match characteristics of light intensity modulation from the fluorescent lamp of the given fluorescent fixture to a unique fixture-identifying characteristic of the data structure to identify a location of the mobile light sensor.

12. The system of claim 11 wherein the unique fixture-identifying characteristic is frequency of light intensity modulation with a frequency component of the light in excess of forty kilohertz.

13. The system of claim 12 wherein the unique fixture-identifying characteristic is frequency component of light intensity modulation in excess of sixty kilohertz.

14. The system of claim 11 wherein the program further executes to select among multiple fixture-identifying characteristics in the data structure based on a previous identified location of the mobile light sensor.

15. The system of claim 11 wherein the mobile light sensor is an electronic camera imaging the given fluorescent light fixture and wherein the program further executes to use an angle of the given light fixture in an image of the given light fixture and the location of the given fluorescent fixture to identify the location of the mobile light sensor.

16. The system of claim 11 wherein the mobile light sensor is an electronic camera imaging the given fluorescent light fixture and wherein the program further executes to use at least one of a size and shape of the given light fixture in an image of the given light fixture and the location of the given fluorescent fixture to identify the location of the mobile light sensor.

17. The system of claim 11 wherein the light sensor is a multipixel electronic camera and wherein the program measures the light from a given fluorescent fixture by treating different rows of pixels as different time domain samples.

18. The system of claim 17 wherein the multipixel electronic camera has a focusable lens and wherein the program moves the lens to a close focus to blur an image of the fluorescent light fixture.

19. The method of claim 1 wherein the light fixture includes an inverter having an inverter frequency and the fixture identifying characteristic is a harmonic frequency of the inverter frequency.

20. The system of claim 11 wherein the light fixture includes an inverter having an inverter frequency and the fixture identifying characteristic is a harmonic frequency of the inverter frequency light amplitude modulation from each fixture.

21. The system of claim 11 wherein variation in the fixture-identifying intensity modulation varies-among the fluorescent fixtures according to the manufacturing tolerances in the fluorescent fixtures.

22. The system of claim 11 including at least two light fixtures not providing unique fixture-identifying light intensity modulation.

23. The system of claim 11 wherein the multiple fluorescent fixtures provide random fixture-identifying characteristics of light intensity modulation.

* * * * *